(12) United States Patent
Han

(10) Patent No.: US 6,448,963 B1
(45) Date of Patent: Sep. 10, 2002

(54) DEVICE FOR AND METHOD OF CODING ERROR GENERATED IN PROCESSING SYNC SIGNALS

(75) Inventor: Seok-Joo Han, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/086,940

(22) Filed: May 29, 1998

(30) Foreign Application Priority Data

May 29, 1997 (KR) .......................................... 97-21522

(51) Int. Cl.[7] ................................................ G09G 5/00

(52) U.S. Cl. .......................... 345/213; 345/212; 345/11; 345/27; 345/128; 348/180; 348/184; 348/185; 348/177

(58) Field of Search ................................ 345/132, 213, 345/127, 3, 904, 11, 27, 128; 455/67.1, 260; 375/376; 348/180, 184, 185, 177

(56) References Cited

U.S. PATENT DOCUMENTS

| | | | | |
|---|---|---|---|---|
| 5,859,671 A | * | 1/1999 | Kim ............................. | 348/500 |
| 5,870,073 A | * | 2/1999 | Kitou et al. ................. | 345/132 |
| 5,956,022 A | * | 9/1999 | Cheng ......................... | 345/213 |
| 6,859,635 | * | 9/1999 | Hang et al. ................. | 345/132 |
| 6,043,814 A | * | 3/2000 | Lim ............................. | 345/326 |
| 6,075,829 A | * | 7/2000 | Hayashi et al. ............. | 375/344 |
| 6,094,236 A | * | 7/2000 | Abe et al. ................... | 348/731 |

* cited by examiner

Primary Examiner—Richard Hjerpe
Assistant Examiner—Ali Zamani
(74) Attorney, Agent, or Firm—Robert E. Bushnell, Esq.

(57) ABSTRACT

A device for coding an error generated in processing sync signals is adapted to code an error caused the incompatibility between a video card and a display monitor so that the user can analyze the cause of the error in the sync signals more effectively from the error code displayed on an OSD display. The device includes: a microcomputer responsive to horizontal and vertical sync signals generated by a video card for discriminating resolutions, and coding an error signal into an error code during discrimination of the resolutions; and an error code section for saving the error code received from the microcomputer.

18 Claims, 3 Drawing Sheets

DEVICE FOR AND METHOD OF CODING ERROR GENERATED IN PROCESSING SYNC SIGNALS

CLAIM OF PRIORITY

This application makes reference to, incorporates the same herein, and claims all benefits accruing under 35 U.S.C. §119 from my applications entitled DEVICE FOR AND METHOD OF CODING ERROR GENERATED IN PROCESSING SYNC SIGNALS filed in the Korean Industrial Property Office on May 29, 1997 and there duly assigned Ser. No. P97-21522 by that Office.

BACKGROUND OF THE INVENTION

1. Technical Field

The present invention generally relates to a device for and method of coding an error caused in processing sync signals. More particularly, the present invention relates to an error coding device and method which are adapted to code an error caused by incompatibility between a video card and a display monitor which is to process the sync signals for synchronizing video signals generated from the video card, and thereby to monitor the cause of the error.

2. Related Art

A display monitor is generally designed to be compatible with a video card which processes video signals generated by a PC (Personal Computer) to generate sync signals for synchronizing the processed video signals. Recently, video cards of various kinds are produced by a large variety of manufacturers, and display monitors have to provide compatibility with almost all video cards for normal operation without errors. Otherwise, a microcomputer in the display monitor hardly processes data so that much time and trouble have to be taken to examine the unprocessed data and work out a countermeasure for it. Furthermore, a delay in the development of the countermeasure for the problem may cause complaints against the display monitor products in the market.

SUMMARY OF THE INVENTION

An object of the present invention is to provide a device for and method of coding an error generated in processing sync signals, wherein the error caused by the incompatibility between a video card and a display monitor is coded by a microcomputer in the display monitor so that the error code can be read if needed.

To achieve these and other advantages and in accordance with the purpose of the present invention, as embodied and broadly described, a device for coding an error generated in processing sync signals includes: a microcomputer responsive to horizontal and vertical sync signals generated by a video card for discriminating resolutions, and coding an error signal into an error code during the period of discriminating the resolutions; and an error code section for saving the error code received from the microcomputer.

In another aspect of the present invention, a method of coding an error generated in processing sync signals includes the steps of: analyzing an error code which occurs under the condition that a phase-locked loop (PLL) malfunctions or a signal cable is not properly connected; generating an error code after the completion of an analysis for the error code; and saving the error code generated.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
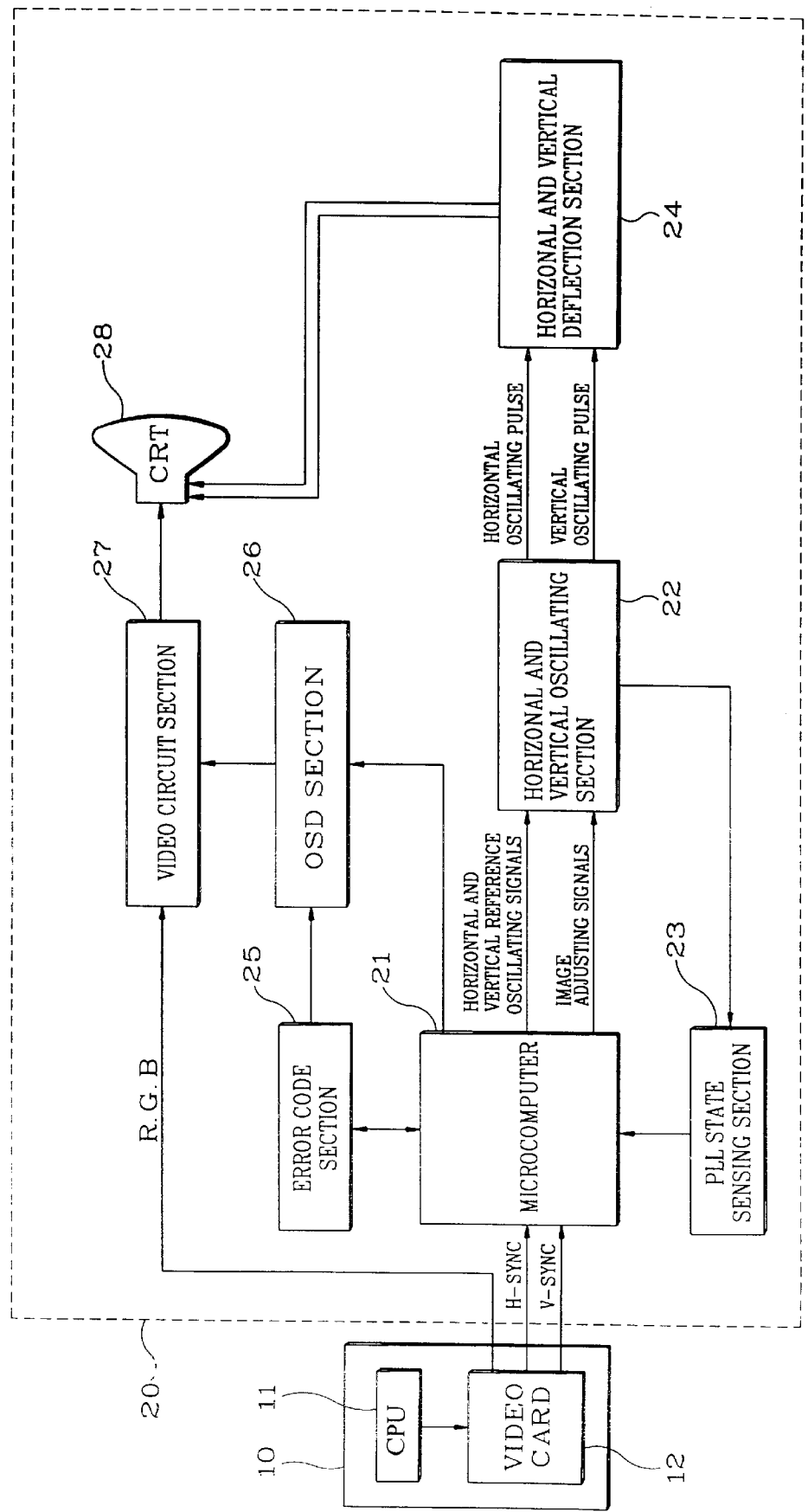
FIG. 1 is a block diagram illustrating the internal circuit of a display monitor having an error to code section in accordance with the present invention.

FIG. 1 is a block diagram showing the internal circuit of a display monitor using an error code section in accordance with the present invention.

As shown in FIG. 1, a device for coding an error according to the present invention comprises: a CPU 11 in a PC 10 for executing a program and thereby generating resulting output data; a video card 12 in the PC 10 for processing the output data of the CPU 11 into R, G and B video signals, and generating horizontal and vertical sync signals H-SYNC and V-SYNC, respectively, which are used to synchronize the R, G and B video signals; a microcomputer 21 for discriminating the resolutions of the R, G and B video signals in response to the horizontal and vertical sync signals H-SYNC and V-SYNC, respectively, generated by the video card 12, and having an error handling program therein to process an error signal for the horizontal and vertical sync signals H-SYNC and V-SYNC, respectively, generated when the microcomputer 21 discriminates the resolutions of the R, G and B video signals; a horizontal and vertical oscillating section 22 for processing horizontal and vertical reference oscillating signals and image adjusting signals generated by the microcomputer 21, and generating horizontal and vertical oscillating pulses; a PLL (Phase-Locked Loop) state sensing section 23 for sensing the states of the horizontal and vertical oscillating pulses generated by the horizontal and vertical oscillating section 22, applying data concerning the states of the horizontal and vertical oscillating pulses to the microcomputer 21, and correcting the horizontal and vertical reference oscillating signals; a horizontal and vertical deflecting section 24 for generating horizontal and vertical sawtooth currents in response to the horizontal and vertical oscillating pulses supplied by the horizontal and vertical oscillating section 22; an error code section 25 for coding the error signal for the sync signals generated by the microcomputer 21, and saving an error code applied thereto; an on-screen display (OSD) section 26 for processing general OSD data received from the microcomputer 21 and error code OSD data from the error code section 25 to generate an OSD gain signal; a video circuit section 27 for selectively amplifying or boosting the OSD gain signal generated by the OSD section 26 and the R, G and B video signals from the video card 12; and a CRT 28 for synchronizing the OSD gain signal and the R, G and B video signals received from the video circuit section 27 according to the horizontal and vertical sawtooth currents generated by the horizontal and vertical deflection section 24 so as to create an image.

Such an arrangement operates as follows.

The CPU 11 of PC 10 executes a program in response to a command by the user and provides resulting data to the video card 12. The video card 12 processes the data to from the R, G and B video signals, and thereby generates output data. In this case, the video card 12 generates horizontal and vertical sync signals H-SYNC and V-SYNC, respectively, which are used to synchronize the R, G and B video signals.

The horizontal and vertical sync signals H-SYNC and V-SYNC, respectively, generated by the video card 12 in the PC 10 are processed by the microcomputer 21 built into the display monitor 20. Microcomputer 21 is responsive to the horizontal and vertical sync signals H-SYNC and V-SYNC, respectively, for generating various image adjusting signals and horizontal and vertical reference oscillating signals according to the resolutions of the R, G and B video signals.

The image adjusting signals generated by the microcomputer 21 are converted into analog is signals through a digital-to-analog converter (not shown) and are transferred to the horizontal and vertical oscillating section 22. On receiving the analog image adjusting signals, the horizontal and vertical oscillating section 22 generates horizontal and vertical oscillating pulses in response to the horizontal and vertical reference oscillating signals received from the microcomputer 21.

The output states of the horizontal and vertical oscillating pulses generated by the horizontal and vertical oscillating section 22 are sensed by the PLL state sensing section 23, which corrects the horizontal and vertical reference oscillating signals generated by the microcomputer 21 so as to stabilize the output of the horizontal and vertical oscillating pulses. If the horizontal and vertical oscillating pulses are unstable, the horizontal and vertical oscillating section 22, which processes the horizontal and vertical reference oscillating signals, provides the horizontal and vertical oscillating pulses to the horizontal and vertical deflection section 24, which generates sawtooth currents.

On the other hand, the R, G and B video signals generated by the video card 12 of the PC 10 are boosted or amplified by the video circuit section 27, and are applied to the CRT 28. OSD section 26 processes normal OSD data selectively generated by the microcomputer 21, and transfers it to the video circuit section 27. The video circuit section 27 boosts or amplifies the OSD gain signal received from the OSD section 26, and sends it to the CRT 28.

The CRT 28 deflects the OSD signal and the R, G and B video signals, which have been boosted or amplified by the video circuit section 27, in response to the sawtooth currents generated by the horizontal and vertical deflection circuit 24 so as to display an OSD image and the video signals. If the video card 12 in the PC 10 is incompatible with a display device, an error occurs in processing the horizontal and vertical sync signals H-SYNC and V-SYNC, respectively, generated by the video card 12 in the microcomputer 21 in the display monitor 20. In this case, a sync signal error handling program stored in the microcomputer 21 is executed in coding the error.

For example, when the video card 12 that processes the data generated by the PC 10 into video signals is incompatible with the display monitor 20, the microcomputer 21 in the display monitor 20 generates an error during the installation of the PC system.

Then, microcomputer 21 executes the sync signal error handling program so as to convert the error signal to a defined format. That is, the error signal is converted into the form of binary digits or another data saving code.

The code converted from the error signal is saved in the error code section 25. The error code section 25 applies the error code to the OSD section 26 under the control of a read control signal received through the microcomputer 21 during the A/S. The OSD section 26 processes the error code and thereby generates an OSD signal, which is boosted or amplified in the video circuit section 27 and displayed on the screen of the CRT 28.

The OSD information corresponding to the error code may be displayed by means of a self raster on the screen of the CRT 28. From the OSD display on the screen of the CRT 28, the user can conveniently analyze the cause of the error generated in the microcomputer 21.

Such an error code section 25 will be described in more detail with reference to FIG. 2.

Figure 2:
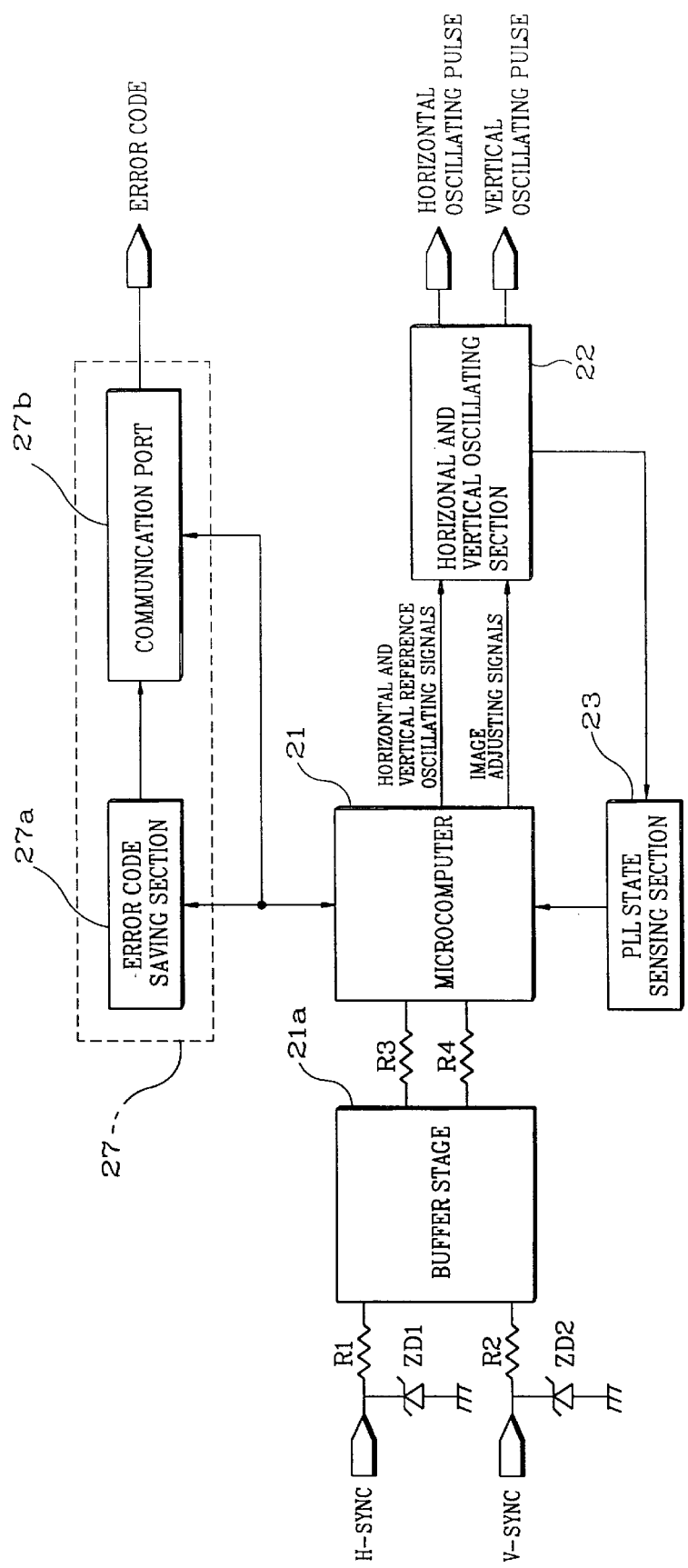
FIG. 2 is a detailed circuit diagram of the error code section shown in FIG. 1.

As shown in FIG. 2, there are included: a buffer stage 2a which provides the waveforms of the horizontal and vertical sync signals H-SYNC and V-SYNC, respectively, received from the video card (reference numeral 12 in FIG. 1) after the removal of noise therefrom; a microcomputer 21 for discriminating the resolutions of the R, G and B video signals in response to the horizontal and vertical sync signals H-SYNC and V-SYNC, respectively, generated by the buffer stage 21 a, and storing an error handling program therein to process an error signal generated when the microcomputer 21 discriminates the resolutions; a horizontal and vertical oscillating section 22 for processing horizontal and vertical reference oscillating signals and image adjusting signals generated by the microcomputer 21, and generating horizontal and vertical oscillating pulses; a PLL (Phase-Locked Loop) state sensing section 23 for sensing the states of the horizontal and vertical oscillating pulses generated by the horizontal and vertical oscillating section 22, applying data concerning the state of the horizontal and vertical oscillating pulses to the microcomputer 21, and correcting the horizontal and vertical reference oscillating signals; an error code section 27 comprising an error code saving section 27a for saving an error code which results from the error signal generated by the microcomputer 21, and a communication port 27b for generating a read control signal received from the microcomputer 21 when a need for the error code saved in the error code stored section 27a arises; control diodes ZD1 and ZD2, and a plurality of resistance R1–R4, disposed at the input and output of buffer stage 21a.

Such a construction operations as follows.

First, the horizontal sync signal H-SYNC generated by the video card 12 is corrected to a specified level by control diode ZD1 and resistance R1, while the vertical sync signal V-SYNC is corrected by control diode ZD2 and resistance R2. Buffer stage 21 a normalizes both horizontal and vertical sync signals H-SYNC and V-SYNC, respectively, by removing noise from them. In response to the horizontal and vertical sync signals H-SYNC and V-SYNC, respectively, which have passed through resistance R3 and R5, the microcomputer 21 discriminates the frequencies and the resolutions of the R, G and B video signals.

Microcomputer 21 generates horizontal and vertical reference oscillating signals as well as various image adjusting signals according to the resolutions. The horizontal and vertical oscillating section 22 is responsive to the horizontal and vertical reference oscillating signals and the image adjusting signals generated by the microcomputer 21 for generating horizontal and vertical oscillating pulses. For stabilization of the horizontal and vertical oscillating pulses, the PLL state sensing section 23 applies a correction signal for any error in the horizontal and vertical oscillating pulses to the microcomputer 21.

Microcomputer 21 corrects the reference oscillating signals in response to the correction signal, and generates the corrected horizontal and vertical reference oscillating pulses, stabilizing the pulses generated by the horizontal and vertical oscillating section 22.

Once an error occurs in processing the sync signals during an installation of the PC system or a program execution, it is coded by the execution of the sync signal error handling program stored in the microcomputer 21. The generated error code is saved in the error code saving section 27a of the error code section 27, and is read from the error code saving section 27a during the A/S. In order to read the error code, the microcomputer 21 provides a read control signal to the communication port 27b.

The communication port 27b reads the error code from the error code saving section 27a in response to the read control signal generated by the microcomputer 21, so that the error code is processed at the OSD section 26 and displayed on the screen of the CRT 28. The OSD information on the screen of the CRT 28 makes it easier to find the cause of the error generated in the microcomputer's processing of the sync signals.

Below is given a detailed description of the operation of the sync signal error handling program stored in the microcomputer with reference to FIG. 3.

Figure 3:
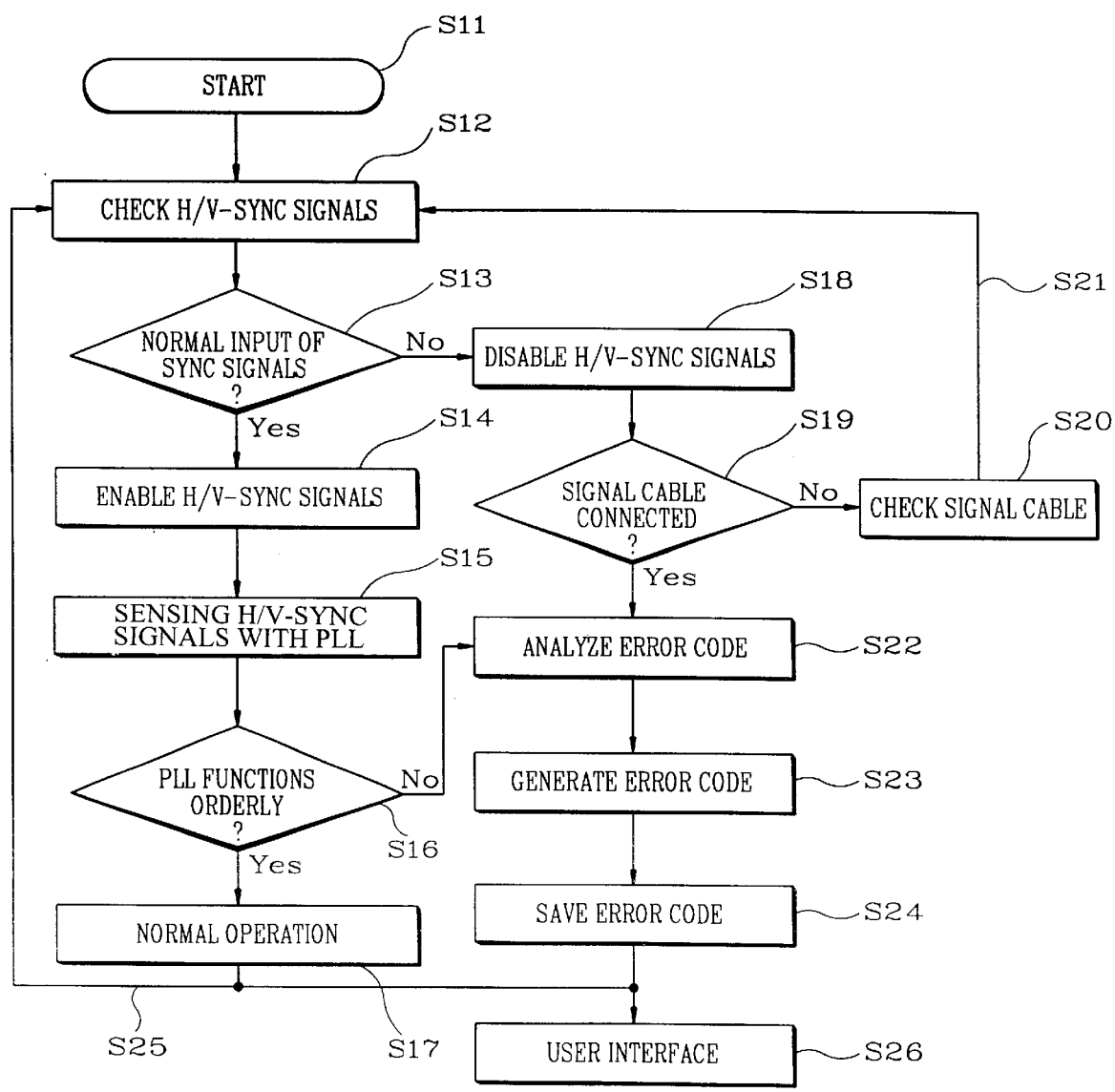
FIG. 3 is a flow chart illustrating a method of coding an error in accordance with the present invention.

As shown in FIG. 3, a method of coding an error according to the present invention comprises the steps of: (S11) generating video signals according to an installation of the PC system or a program execution; (S12) checking for the presence of horizontal and vertical sync signals which are used to synchronize the video signals generated; (S13) checking whether the horizontal and vertical sync signals are fed in the normal state; (S14) if the horizontal and vertical sync signals are in the normal state, enabling the output of the horizontal and vertical sync signals; (S15) sensing the output states of the horizontal and vertical sync signals with a PLL; (S16) checking the operation state and functions of the PLL; and (S17) if the PLL functions orderly, displaying the video signals generated by the computer system (normal operation).

A method of connecting a signal cable when the sync signals are fed with an error comprises the steps of: (S18) if it is determined in step S13 that the horizontal and vertical sync signals are fed with an error, disabling the output of the horizontal and vertical sync signals; (S19) checking the connection of the signal cable for transmission of the sync signals; (S20) if the signal cable is not properly connected, displaying a message to check the signal cable; and (S21) if the signal cable is connected according to the direction on the OSD display, returning to step S12 of checking for the presence of the horizontal and vertical sync signals.

A method of coding an error caused by an erroneous input of the sync signals with the signal cable properly connected comprises the steps of: (S22) if the PLL malfunctions, in step S16, or the signal cable is not properly connected; in step S19, analyzing an error generated; (S23) generating an error code after the analysis of the error in step S22; (S24) saving the error code generated in step S23; and (S25) after the error code is saved, in step S24, or the PLL functions in an orderly manner, in step S17, returning to step S12 of checking for the presence of the horizontal and vertical sync signals in order to check the states of the sync signals or to find the factor of another error in reprocessing the sync signals.

The method further comprises the user interface step (S25) of generating the error code saved in step S24, and analyzing the cause of an error generated in processing the sync signals. The operation of such a construction will be described in further detail as follows.

In the first step S11, the user installs a PC system or runs a wanted program with the PC 10 so that the sync signal error handling program stored in the microcomputer 21 (FIG. 2) is executed with a default. With the sync signal error handling program running, whether the PC 10 (FIG. 2) generates horizontal and vertical sync signals is checked in step S12.

In step S13, it is determined whether the horizontal and vertical sync signals are fed into the display monitor 20 (FIG. 2) in the normal state. That is, the compatibility of the horizontal and vertical sync signals with the display monitor 20 or the state of their input into the display monitor 20 through a signal cable is checked. If the horizontal and vertical sync signals are fed into the display monitor 20 without error, the microcomputer 21 generates image adjusting signals and horizontal and vertical oscillating signals by enabling the horizontal and vertical sync signals, in step S14.

The horizontal and vertical oscillating section 22 (FIG. 1) processes the horizontal and vertical oscillating signals transmitted from the microcomputer 21, generating horizontal and vertical oscillating pulses. In step S15, the PLL sensing section 23 senses the states of the horizontal and vertical oscillating pulses. That is, the microcomputer 21 is controlled to generate corrected reference oscillating signals according to the erroneous output of the horizontal and vertical oscillating pulses. If the PLL functions orderly in step S16, the video signals generated by the PC 10 are displayed on the screen of the CRT 28 (FIG. 2), in step S17.

If the horizontal and vertical sync signals are turned out to cause an error in step S13, the output of the horizontal and vertical sync signals is disabled in step S18. When the horizontal and vertical sync signals are disabled at the microcomputer 21 in the display monitor 20 in step S18, it is determined whether the signal cable functions in an orderly manner to transmit the horizontal and vertical sync signal generated by the PC 10, in step S19.

That is, once the horizontal and vertical sync signals are fed into the display monitor 20 with an error, the connection state of the signal cable or any error on the signal cable is determined. In case of an error caused by the improper connection of the signal cable or by the signal cable itself, the signal cable is correctly reconnected or a message to replace the signal cable is displayed on the OSD display, in step S20. After the check of the signal cable, the process returns to step S12 of checking for the presence of the horizontal and vertical sync signals in order to find an error in the sync signals.

Further, when the PLL malfunctions, in step S16, but the signal cable is correctly connected, in step S19, an error results from the incompatibility of the video card 12 (FIG. 2) with the display it monitor 20 or from the erroneous sync signals. Such an error is analyzed with a conversion table in step S22. After the analysis of the error, an error code is generated according to the save format, in step S23.

In conformity with the data save format, the error code generated is saved in the error code. saving section 27a (FIG. 3) in step S24. Then, the process returns to step S12 of checking for the presence of the horizontal and vertical sync signals. After this, the error code is displayed so that the user will find out the cause of the sync signal error generated in the display monitor 20 in the user interface step S26.

That is, the error code saved in the error code saving section 27a is displayed as an OSD signal on the OSD display through the communication port 27b (FIG. 3) or by means of another display, so that the user can easily find the cause of the error in the sync signals.

With the present invention as described above, an error caused by the incompatibility between the video card and the display monitor is coded and displayed so that the user can analyze the cause of the error in the sync signals more effectively.

It will be apparent to those skilled in the art that various modifications and variations can be made in the device for and method of coding an error generated in processing sync signals according to the present invention without departing from the spirit or scope of the invention. Thus, it is intended that the present invention cover the modifications and variations of this invention provided they come within the scope of the appended claims and their equivalents.

What is claimed is:

1. A device for coding an error generated in processing sync signals, comprising:

microcomputer means responsive to horizontal and vertical sync signals generated by a video card for discriminating resolutions, and for encoding an error signal to form an error code during a period of discriminating the resolutions; and error code section means for receiving and storing the error code from the microcomputer means;

wherein said microcomputer means analyzes the error code when one of a phase-locked loop (PLL) malfunction and improper connection of a signal cable occurs.

2. The device as defined in claim 1, wherein the error code section means comprises:

an error code saving section for storing the error code from the microcomputer means; and a communication port for transmitting the error code stored in the error code saving section.

3. The device as defined in claim 1, wherein said microcomputer means generates the error code at the completion of the analyzing by said microcomputer means.

4. The device as defined in claim 1, wherein said microcomputer means transmits the error code stored in the error code section means to a user so as to facilitate analysis of the error code of an error generated in processing the sync signals.

5. A method of coding an error generated in processing sync signals, comprising the steps of:

sensing horizontal and vertical sync signals with a phase-locked loop (PLL);

determining whether the PLL is functioning in an orderly manner;

when the PLL is not functioning in an orderly manner, analyzing an error code which occurs with a PLL malfunction;

generating an error code after completion of the analyzing step; and saving the error code generated in the generating step.

6. If The method as defined in claim 5, further comprising the step of transmitting the saved error code to a user so as to facilitate analysis of the cause of the error generated in processing the sync signals.

7. The method as defined in claim 5, further comprising the step, prior to the analyzing step, of checking horizontal and vertical sync signals to determine normal input thereof and, when abnormal input of the sync signals is determined, disabling the sync signals.

8. The method as defined in claim 7, further comprising the steps, subsequent to the disabling step, of determining whether a signal cable is properly connected and, when said signal cable is not properly connected, checking the signal cable and then checking the horizontal and vertical sync signals.

9. A method of coding an error generated in processing sync signals, comprising the steps of;

checking horizontal and vertical sync signals;

determining whether said sync signals are normally input;

when said signals are not normally input, disabling said horizontal and vertical sync signals; and when said sync signals are normally input, enabling said horizontal and vertical sync signals, sensing the horizontal and vertical sync signals with a phase-locked loop (PLL), determining whether said PLL is functioning in an orderly manner and, when said PLL is not functioning in an orderly manner, analyzing an error code.

10. The method as defined in claim 9, further comprising the step of transmitting the error code to a user so as to facilitate analysis of the error code of an error generated in processing the sync signals.

11. The method as defined in claim 9, further comprising the step, after said analyzing step, of generating the error code and saving the error code.

12. The method as defined in claim 11, further comprising the step of transmitting the saved error code to a user so as to facilitate analysis of the error code of an error generated in processing the sync signals.

13. A method of coding an error generated in processing sync signals, comprising the steps of;

checking horizontal and vertical sync signals;

determining whether said sync signals are normally input;

when said sync signals are not normally input, disabling horizontal and vertical sync signals and determining whether a signal cable is properly connected; and when said signal cable is properly connected, analyzing an error code.

14. The method as defined in claim 13, further comprising the steps, after said analyzing step, of generating the error code and saving the error code.

15. The method as defined in claim 13, further comprising the step, when said signal cable is not properly connected, of checking the signal cable, and then returning to the step of checking the horizontal and vertical sync signals.

16. The method as defined in claim 13, further comprising the steps of generating the error code and saving the error code.

17. The method as defined in claim 13, further comprising the step of transmitting the error code to a user so as to facilitate analysis of the error code of an error generated in processing the sync signals.

18. The method as defined in claim 16, further comprising the step of transmitting the saved error code to a user so as to facilitate analysis of the error code of an error generated in processing the sync signals.

* * * * *